UNITED STATES PATENT OFFICE.

CHARLES BASKERVILLE, OF NEW YORK, N. Y.

PROCESS OF PRODUCING A PLASTIC MATERIAL.

1,231,985.  Specification of Letters Patent.   Patented July 3, 1917.

No Drawing.   Application filed November 13, 1914. Serial No. 871,956.

*To all whom it may concern:*

Be it known that I, CHARLES BASKERVILLE, a citizen of the United States, residing at New York, in the county of New York and State of New York, have invented certain new and useful Improvements in Processes of Producing a Plastic Material, of which the following is a specification.

The present invention relates to the production of a plastic material, suitable for use as a substitute for high grade asphalt, for the construction of roads, for waterproofing walls, for waterproofing wooden or ceramic articles, or as a protective coating on telegraph poles and the like.

The process forming the subject matter of my invention relates to the treatment of "acid sludge" which is, as is well known, a by-product of the refining of asphaltic petroleum or its distillates, shale oil and its distillates, and other similar oils.

It has been proposed to mix the "acid sludge" with concentrated sulfuric acid, and heat up the same by means of live steam, and at a temperature below complete charring, a certain amount of oil separates from the mass, after which the remainder of the mass, is further heated, in order to carbonize the same, and produce a mass resembling coke. This coky mass after being once washed with water, to remove the bulk of the free sulfuric acid, is mixed with coal and burned, since it contains a certain fuel value. This coke, however, always contains a considerable amount of sulfuric acid, which has not been removed by washing, which somewhat lowers its fuel value, and also gives rise to the production of large amounts of sulfur dioxid in the products of combustion. This is a common method of disposing of the sludge, obtained in large amounts from the treatment of oils or distillates, especially oils of an asphaltic base, or of a partly asphaltic base. The process above outlined may be regarded as taking place in two stages, although in practice they are so merged into each other, that the process appears as one step only. In the heating of the "acid sludge" a portion of the retained oil separates from the pasty mass, which oil becomes quite liquid, at a temperature below that at which the material completely chars, and at this point rises to the top of the original mixture. This step may require about an hour to an hour and a half. The oil may be drawn off at this time, and its values recovered in any suitable manner. In carrying out the process above outlined, after drawing off the oil, the mass is heated for several hours longer, until the mass becomes more or less decomposed and carbonized, and a considerable amount of sulfur dioxid is evolved, after which the mass is allowed to separate into two layers, and the heavy sulfuric acid drawn off. After this the coky mass is washed with water once, and is thereafter used as fuel, and usually contains from 3 to 15% of free sulfuric acid.

After elaborate experimentation, I have found that the expensive treatment and large apparatus are unnecessary, and furthermore that the "acid sludge" particularly if obtained from an oil with an asphaltic or partly asphaltic base, may be converted in a very short time into a product of commercial value, said product being suitable for use as a substitute for asphalt, for the purposes referred to.

During the preliminary heating of the sludge as above referred to, either with or without the addition of strong sulfuric acid at the commencement of the operation, I take samples, and observe the time when the major portion of the refinable oil has separated from the mass. When this condition obtains, which is usually within about an hour or an hour and a half, I preferably allow the mass to remain stationary without agitation, for a short time, in order for the oil to separate, as completely as possible from the mass, as an upper layer, which I draw off. At the same time the heavy sulfuric acid settles to the bottom, and I may also draw this off, as a separate product, for further use in the refining of petroleum, after suitable purification, or for other purposes. The middle fraction, which has not been heated high enough and long enough, with sulfuric acid, to become carbonized to any material extent, (which would destroy its asphaltic nature,) is a pasty mass, quite liquid at the existing temperature, and may be drawn off separately. This material contains usually from 15 to 25% of sulfuric acid; although the amount of sulfuric acid will in some cases vary considerably more than this. The mass is weighed and is at once run into a suitable mill where it is mixed in proper proportion with lime which has been slaked with just sufficient water to cause it to crumble to a powder. In practice a small excess of lime is preferably employed.

The mixture is then kneaded in a mill, in order to bring the slaked lime and sulfuric acid into contact with each other, in order to neutralize the acid present in the mass. During this operation much heat is evolved, by the union of the free acid with the slaked lime, but not enough heat will be generated to char the material.

At the end of this operation, unless sufficient heat has been generated during the mixing to render the mass entirely fluid, it may be heated up to 220° C., more or less, at which temperature it becomes fluid and is run into barrels or other suitable receptacles for marketing.

In place of the slaked lime above referred to, I may use other neutralizing agents, thus finely divided lime stone or chalk may be substituted, for all or a part of the slaked lime, but the slaked lime appears to produce a better product.

In carrying out my process I avoid destroying the asphaltic material present in the residuum, and have incorporated therein from 20 to 40% of calcium sulfate depending upon the amount of free acid in the sludge. The asphaltic or bitumenic material contained in the mass may be separated from the calcium sulfate by means of suitable solvents if desired.

The mass exhibits the properties associated with asphalt, of course, somewhat modified by the presence of the calcium salt. Upon warming to a melting temperature, or a softening temperature, it may be applied in the construction of roads, for waterproofing walls and the like or as a protection against rotting in telegraph poles and the like.

In a modification of the process, I may treat the sludge directly with slaked lime, in amount sufficient to substantially neutralize all the acid present, or a slight excess of lime. This process, however, gives a material which for most purposes is somewhat inferior to that produced by the more extensive process above referred to, and also does not produce the valuable by products, oil and strong acid.

What I claim is:—

1. A process of recovering asphaltic material which comprises heating acid sludge obtained as a by-product in the refining of petroleum oil by means of sulfuric acid, sufficiently to cause a separation of at least a portion of the oil contained therein, but below the temperature necessary for producing any considerable amount of carbonization of said sludge, removing the asphaltic portion of said sludge and intimately mixing the same with a neutralizing agent.

2. A process of recovering asphaltic material which comprises heating acid sludge obtained as a by-product in the refining of petroleum oil by means of sulfuric acid, sufficiently to cause a separation of at least a portion of the oil contained therein, but below the temperature necessary for producing any considerable amount of carbonization of said sludge, removing the asphaltic portion of said sludge and intimately mixing the same with a calcareous neutralizing agent.

3. A process of recovering asphaltic material which comprises separating oil and sulfuric acid from the acid sludge produced as a by-product in the refining of petroleum oils with asphaltic base, and intimately mixing the asphaltic portion of said sludge with approximately a sufficient amount of slaked lime to neutralize the acid therein.

4. A process of treating acid sludge from the acid treatment of oils containing asphalt, said process comprising the steps of heating said sludge sufficiently to cause the separation of an asphaltic fraction, withdrawing said asphaltic fraction and adding an alkali thereto, in amount sufficient to neutralize at least the major portion of the acid therein.

5. A process which comprises heating acid sludge to a temperature below that necessary to produce any considerable amount of carbonization of the asphaltic constituents thereof, but sufficient to cause a separation of said asphaltic constituents from the bulk of the oil and free acid, and intimately mixing said asphaltic portion with an agent capable of neutralizing the acid contained therein.

6. A process which comprises heating a mixture of acid sludge derived from petroleum having an asphaltic base and sulfuric acid, to a temperature below that at which any considerable amount of carbonization is produced, but sufficient to cause a separation of the material into fractions of different gravities, separating the asphaltic fraction from the other fractions and intimately mixing the same with a calcareous agent capable of neutralizing the acid contained therein.

7. A process of recovering asphaltic material which comprises separating oil and sulphuric acid from the acid sludge produced as a by-product in the refining of petroleum oils having an asphaltic base, and intimately mixing the asphaltic portion with a neutralizing agent.

In testimony whereof I affix my signature in presence of two witnesses.

CHARLES BASKERVILLE.

Witnesses:
Thomas F. O'Keeffe,
Israel Katz.